(12) United States Patent
Dhawan et al.

(10) Patent No.: US 11,575,790 B2
(45) Date of Patent: *Feb. 7, 2023

(54) UPFRONT CUSTOMER TIME CONSIDERATION ALONG WITH OPTIMIZED AGENT DESKTOP IN A CONTACT CENTER

(71) Applicant: NICE LTD, Ra'anana (IL)

(72) Inventors: Salil Dhawan, Maharashtra (IN); Rahul Vyas, Jodhpur-Rajasthan (IN)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,721

(22) Filed: Mar. 7, 2022

(65) Prior Publication Data
US 2022/0191327 A1 Jun. 16, 2022

Related U.S. Application Data

(63) Continuation of application No. 17/207,781, filed on Mar. 22, 2021, which is a continuation of application No. 15/931,619, filed on May 14, 2020, now Pat. No. 10,992,808.

(51) Int. Cl.
*H04M 3/00* (2006.01)
*H04M 3/51* (2006.01)
*H04M 3/523* (2006.01)
*H04L 65/1059* (2022.01)
*H04L 65/1104* (2022.01)

(52) U.S. Cl.
CPC ...... *H04M 3/5183* (2013.01); *H04L 65/1059* (2013.01); *H04L 65/1104* (2022.05); *H04M 3/5133* (2013.01); *H04M 3/5238* (2013.01); *H04M 2203/551* (2013.01)

(58) Field of Classification Search
CPC ............ H04M 3/5183; H04M 3/5133; H04M 3/5238; H04M 2203/551; H04L 65/1104; H04L 65/1059
USPC ....... 379/265.01–265.14, 266.01–266.1, 309
See application file for complete search history.

(56) References Cited

U.S. PATENT DOCUMENTS 9,762,733 B1 * 9/2017 Ramanujaiaha .. H04M 3/42068
10,021,245 B1 * 7/2018 Koster ................ H04M 3/5133
10,154,138 B2 * 12/2018 te Booij ............. H04M 3/5175
(Continued)

*Primary Examiner* — William J Deane, Jr.
(74) *Attorney, Agent, or Firm* — Soroker Agmon Nordman

(57) ABSTRACT

A computerized-method using a cloud-based computing environment for improving client service, in a contact center is provided herein. The computerized-method includes: retrieving a context of a query and a time-limit from a CTI event and attempting to retrieve data to evaluate average resolution time for the received context. When the data is found, comparing the evaluated average resolution time with the received time-limit and when the received time-limit is below the evaluated average resolution time, sending a delay notice and providing the client a menu of options for querying through other channels. When the data is not found, or when the received time-limit is above the evaluated average resolution time, presenting on an agent dashboard, the time-limit of the client and accordingly updating parameters in the agent dashboard during the inbound call, thus, improving client service, by considering the time-limit of the client before the agent addresses a query.

18 Claims, 7 Drawing Sheets

(56) References Cited

U.S. PATENT DOCUMENTS

| | | | | |
|---|---|---|---|---|
| 2001/0018700 A1* | 8/2001 | Clarke | ................... | G06F 9/543 |
| | | | | 718/104 |
| 2015/0103999 A1* | 4/2015 | Nowak | .............. | G06Q 10/0637 |
| | | | | 379/266.01 |
| 2015/0201547 A1* | 7/2015 | Gschwendtner | ........ | F16H 47/04 |
| | | | | 172/7 |
| 2015/0373196 A1* | 12/2015 | Scott | ....................... | G10L 21/10 |
| | | | | 704/235 |
| 2018/0084111 A1* | 3/2018 | Pirat | ....................... | H04L 51/04 |
| 2020/0288017 A1* | 9/2020 | Spottiswoode | ......... | G06F 16/23 |

* cited by examiner

UPFRONT CUSTOMER TIME CONSIDERATION ALONG WITH OPTIMIZED AGENT DESKTOP IN A CONTACT CENTER

RELATED APPLICATIONS

This application claims priority as a continuation from U.S. application Ser. No. 17/207,781 dated Mar. 22, 2021 which is a continuation from U.S. application Ser. No. 15/931,619 dated May 14, 2020, the disclosure of which is incorporated herein by reference.

TECHNICAL FIELD

The present disclosure relates to the field of computerized systems and methods for improving client service, in a contact center, by considering a time constraint of a client before an agent addresses a query of the client.

BACKGROUND

Organizations constantly strive to improve the quality of service that they provide to their clients via a related contact center on one hand and reduce the contact center expenses on the other hand. However, as much as these two goals seem to be contradicting each other, they might go hand in hand when each inbound interaction in the contact center results in a quick and meaningful query resolution that prevents clients' dissatisfaction.

For example, extra expenses which are paid to clients which are dissatisfied due to long waiting time in an inbound calling queue might be saved to the organization. Sometimes, clients may be dissatisfied because on top of a long waiting time for an available agent, they don't receive resolution by the agent dining a time constraint they had. Therefore, organizations may endeavor to have their clients satisfied.

Moreover, satisfied clients may contribute to a high client retention rate. When clients are not satisfied, clients' base may shrink and leaving clients may also spread bad word-of-mouth, which eventually leads to low client retention rate and later plummet the organization's profits.

Moreover, clients' satisfaction doesn't just impact the business' bottom line, it also impacts the morale of the agents' team in the contact center which also may impact the retention rate. While business may survive with angry, single-purchase customers, only businesses which focus on customer satisfaction will thrive. Therefore, for an organization that considers or cares about customer satisfaction, it may be the key for its thriving instead of its surviving.

Some market researches show, that an increased customer satisfaction, is a key in creating a long-term relationship with customers. Accordingly, an organization has to constantly keep delivering value to its clients. For example, one market research has showed that 81% of satisfied customers are more likely to do business again with an organization, if they had a positive experience. 95% of customers will act after a negative experience by sharing concerns with friends and family, or churning.

Another aspect of customers' satisfaction is that an ongoing satisfaction of customers may lead to customers loyalty. Once customers have placed trust in an organization or a company and are assured that the company will continue to deliver value for them then they will continue to do business with the organization. Also, satisfied customers are most likely to recommend the organization's service to their network of friends. Customer advocacy is known to be a very efficient form of marketing. For example, small businesses estimate that 85% of their new clients come from word of mouth. Therefore, it may be cheaper to keep clients satisfied than trying to acquire a new customer. It's six times more expensive to woo a new customer than it is to retain an existing one.

A high First-Call resolution (FCR) i.e., a high ability of a contact center to resolve customer problems, questions or needs the first time the customers call, with no follow-up required, is almost always associated with high levels of customer satisfaction. FCR is considered as a measure of how effectively the contact center conducts its business and is a function of many factors, including the complexity and types of transactions handled, the experience of the agents, the quality of agent training, and implemented tools such as knowledge management and remote control.

There are times when customers themselves are time bound and have only limited amount of time for an interaction with an agent in the contact center agent at a particular instance. In such a case, currently neither the contact center nor the agent that will be associated with the call are aware of this time bound customer. As a result, the agent may address the customer call in no different way from a regular call. As a result, there may be a possibility that when the agent is not aware of the customer time constraints and the interaction takes longer than the customer's time constraints: (a) customer abruptly drops the call in-between while talking to agent; (b) the agent repeatedly may hold the call to look into knowledge base, transfer the call, etc. As a result, the customer may get dissatisfied.

To achieve a high level of FCR and for an agent to be more efficient the time constraint of the client has to be taken into consideration when the agent attends the interaction and the agent may work towards a call resolution accordingly. For example, when the agent is aware of the time constraint of the client the agent won't put the client on hold during the interaction or won't transfer the client to another agent. Moreover, no interaction between a client and an agent will end abruptly without agreeing on the next steps for resolution of the query if call couldn't be completed within client time constrained limit.

Therefore, there is a need for a system and a method for improving client service by empowering agents with greater clarity of customer time constraint i.e., time limit for the call, thus elevating client's satisfaction as call will be handled by the agent in the best possible way.

In other words, there is a need for a system and method that will improve client service by making sure that the contact center takes into account customer's time constraint while answering a customer query.

SUMMARY

There is thus provided, in accordance with some embodiments of the present disclosure, a computerized-method for using a cloud-based computing environment for improving client service, in a contact center.

In accordance with some embodiments of the present disclosure, in a computerized system comprising a processor, a database of historical data and a memory to store the database, upon an inbound call to the contact center, said processor is configured to operate an Interaction Manager (IM) microservice to receive a Computer Telephony Integration (CTI) event and send it to an Agent Desktop Optimizer (ADO) module. The ADO module may be a feature of an Automatic Contact Distributer component in a contact center system.

Furthermore, in accordance with some embodiments of the present disclosure, the ADO module may be configured to retrieve a context of a query and a time-limit of a client from the received CTI event.

Furthermore, in accordance with some embodiments of the present disclosure, the ADO module may attempt to retrieve data from the database of historical data to evaluate average resolution time for the received context. The time-limit may be expressed in minutes.

Furthermore, in accordance with some embodiments of the present disclosure, when the data is found in the historical database, the ADO module may compare the evaluated average resolution time with the received time-limit and when the received time-limit is below the evaluated average resolution time, the ADO module may send the client a delay notice and provide the client a menu of options for querying through other channels.

Furthermore, in accordance with some embodiments of the present disclosure, when the data is not found, or when the received time-limit is above the evaluated average resolution time, the ADO module may present on an agent dashboard, via a display unit, the time-limit of the client and accordingly update parameters in the agent dashboard during the inbound call.

Furthermore, in accordance with some embodiments of the present disclosure, the ADO module may improve client service, by considering the time-limit of the client before the agent addresses the query of the client.

Furthermore, in accordance with some embodiments of the present disclosure, the delay notice may include the average resolution time required for the context of the query.

Furthermore, in accordance with some embodiments of the present disclosure, the average resolution time may be evaluated by retrieving the total amount of time for a total number of interactions related to the received context during a preconfigured period of time and dividing the retrieved total amount of time by the total number of interactions.

Furthermore, in accordance with some embodiments of the present disclosure, upon a selection of the client to consider time-queue, the ADO module may update the received time-limit by reducing an evaluated average waiting time for the received query from said received time-limit before attempting data retrieval from the database of historical data.

Furthermore, in accordance with some embodiments of the present disclosure, the ADO module may send the evaluated average waiting time to the client.

Furthermore, in accordance with some embodiments of the present disclosure, the menu of options may include at least one of: a callback, leaving voice message on IVR, an email, a chat, a Short Message Service (SMS) or any other communication channel.

Furthermore, in accordance with some embodiments of the present disclosure, the evaluated average waiting time may be calculated according to the number of interactions in a queue of related context multiplied by an evaluated average resolution time.

Furthermore, in accordance with some embodiments of the present disclosure, the time-limit may be received via a contact center application that is operating on a mobile device of the client, and the contact center application may insert the time-limit into a header of a Session Initiation Protocol (SIP) INVITE message and the ADO module may retrieve the time-limit from the SIP INVITE message.

Furthermore, in accordance with some embodiments of the present disclosure, the agent dashboard i.e., agent desktop may be operated by a web User Interface (UI).

Furthermore, in accordance with some embodiments of the present disclosure, the ADO module is a microservice which is used to optimize an agent desktop for improving client service by processing the time-limit that a client provides. For example, the time-limit may be processed into a SIP Invite message header. In another example, the ADO may also obtain the average historical time related to the same client or other clients and then compare it with the time-limit that has been provided inside the SIP Invite message header. Once a final time-limit is calculated by the task manager it may provide it to a Web UI element i.e., agent desktop that is hosted inside an on-demand cloud computing platforms such as AWS cloud and thus optimize it.

There is further provided, in accordance with some embodiments of the present invention, a computerized-system using a cloud-based computing environment for improving client service, in a contact center.

Furthermore, in accordance with some embodiments of the present disclosure, the computerized-system includes a processor, a database of historical data, and a memory configured to store said database of historical data, and upon an inbound call to the contact center, the processor may operate an Interaction Manager (IM) microservice to receive a Computer Telephony Integration (CTI) event and may send it to an Agent Desktop Optimizer (ADO) module.

Furthermore, in accordance with some embodiments of the present disclosure, the ADO may retrieve a context of a query and a time-limit of a client from the CTI event.

Furthermore, in accordance with some embodiments of the present disclosure, the ADO module may attempt to retrieve data from the database of historical data to evaluate average resolution time for the received context. The time-limit may be expressed in minutes.

Furthermore, in accordance with some embodiments of the present disclosure, when the data is found in the historical database, the ADO module may compare the evaluated average resolution time with the received time-limit and when the received time-limit is below the evaluated average resolution time, the ADO module may send the client a delay notice and provide the client a menu of options for querying through other channels.

Furthermore, in accordance with some embodiments of the present disclosure, when the data is not found, or when the received time-limit is above the evaluated average resolution time, the ADO module may present on an agent dashboard, via a display unit, the time-limit of the client and accordingly update parameters in the agent dashboard during the inbound call.

Furthermore, in accordance with some embodiments of the present disclosure, the ADO module may improve client service, by considering the time-limit of the client before the agent addresses the query of the client.

Furthermore, in accordance with some embodiments of the present disclosure, the delay notice may include the average resolution time required for the context of the query.

Furthermore, in accordance with some embodiments of the present disclosure, the average resolution time may be evaluated by retrieving the total amount of time for a total number of interactions related to the received context during a preconfigured period of time and dividing the retrieved total amount of time by the total number of interactions.

Furthermore, in accordance with some embodiments of the present disclosure, upon a selection of the client to consider time-queue, the ADO module may update the received time-limit by reducing an evaluated average waiting time for the received query from said received time-limit before attempting data retrieval from the database of historical data.

Furthermore, in accordance with some embodiments of the present disclosure, the ADO module may send the evaluated average waiting time to the client.

Furthermore, in accordance with some embodiments of the present disclosure, the menu of options may include at least one of: a callback, leaving voice message on IVR, an email, a chat, a Short Message Service (SMS) or any other communication channel.

Furthermore, in accordance with some embodiments of the present disclosure, the evaluated average waiting time may be calculated according to the number of interactions in a queue of related context multiplied by an evaluated average resolution time.

Furthermore, in accordance with some embodiments of the present disclosure, the time-limit may be received via a contact center application that is operating on a mobile device of the client, and the contact center application may insert the time-limit into a header of a Session Initiation Protocol (SIP) INVITE message and the ADO module may retrieve the time-limit from the SIP INVITE message.

Furthermore, in accordance with some embodiments of the present disclosure, the agent dashboard i.e., agent desktop may be operated by a web User Interface (UI).

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

Figure 1:
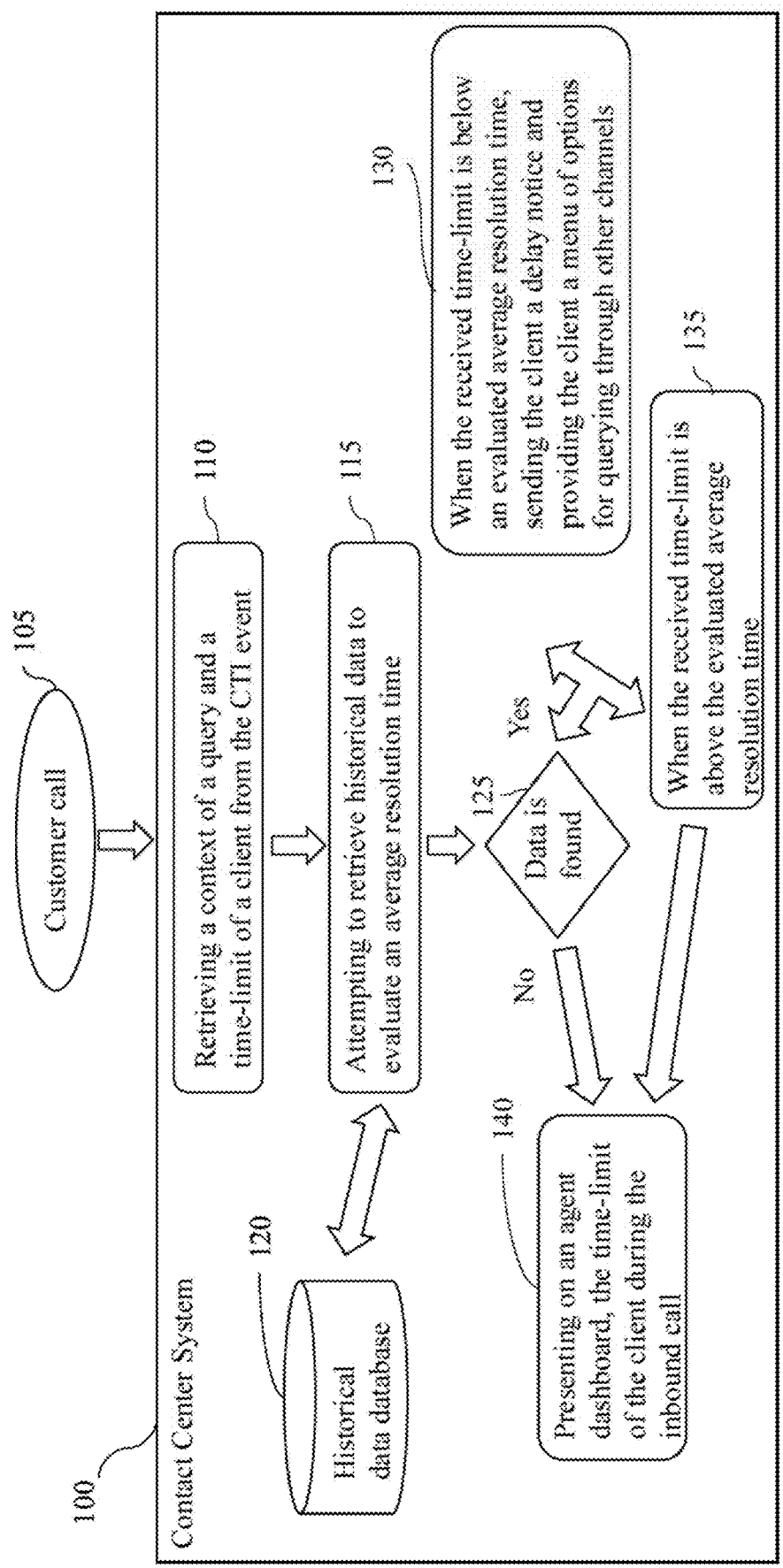
FIG. 1 schematically illustrates a high-level diagram of a computerized-method for improving client service by considering a time-limit, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example. "processing," "computing." "calculating," "determining." "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the term "requirements" refers to the number of people needed to answer all expected inbound interactions for a call center in a given time interval. The expected inbound interactions may come in via calls, SMS, email, chat, video, etc.

As used herein, the term "Average Handle Time (AHT)" refers to average resolution time of a ticket i.e., a client query in a contact center.

As used herein, the term "Session Initiation Protocol (SIP) INVITE" refers to a message sent on a SIP phone call, by a calling party which is inviting the recipient for a session. The SIP headers included in this SIP INVITE request provide information about the message.

As used herein, the term "agent dashboard" refers to a type of graphical user interface which provides a report or at-a-glance views of parameters which are relevant to inbound calls. The "dashboard" is often displayed on a web page which is linked to a database that allows the report to be constantly updated. The views structure and content may also change according to one or more parameters.

As used herein, the term "Public Switch Telephone System (PSTN)" refers to the public switched telephone network which is the aggregate of the world's circuit-switched telephone networks that are operated by national, regional, or local telephone operators, providing infrastructure and services for public telecommunication.

As used herein, the term "Media gateway" refers to a component that is for transmitting telephone calls between an Internet Protocol (IP) network and traditional analog facilities of the Public Switched Telephone Network (PSTN).

As used herein, the term "Session Border Controller (SBC)" refers to dedicated device which protects and regulates IP communications flows. SBC devices are deployed at network borders to control IP communications sessions. SBC devices are used to regulate all forms of real-time communications including Voice Over IP (VoIP), IP video, text chat and collaboration sessions. SBC devices manipulate IP communications signaling and media streams, providing a variety of functions including: security, multivendor interoperability, protocol interworking quality of service and session routing.

The terms "client" and "customer" as used herein are interchangeable.

The terms "upfront time" and "time-limit" may be interchangeable.

The terms Computer Telephony Integration (CTI) and Call Details Records (CDR) are interchangeable.

As used herein, the term "Amazon Web Service (AWS)" refers to a service of an on-demand cloud computing platforms that Amazon provides.

The term "Elastic Load Balancing (ELB)" as used herein refers to a load-balancing service in a cloud-based computing environment such as Amazon Web Services (AWS) deployments. ELB automatically distributes incoming application traffic and scales resources to meet traffic demands. The ELB may be attached for each Micro-Service (MS) instance. In a non-limiting example, for each database such as MySQL instance an ELB may be attached to it. The purpose of automatic scaling is to automatically increase the size of Auto Scaling group when demand for resources goes up and to decrease it when demand goes down. As capacity is increased or decreased, the Amazon EC2 instances being added or removed must be registered or deregistered with a load balancer. This enables an application to automatically distribute incoming web traffic across such a dynamically changing number of instances.

The term "Amazon Kinesis Data Streams (KDS)" as used herein refers to a service that is used to collect and process large streams of data records in real-time.

As used herein, the term "Micro Service (MS)" refers to an architectural style that structures an application as a collection of services.

As used herein, the term "Contact center platform" refers to an MS which is hosted inside an on-demand cloud computing platforms such as AWS cloud infrastructure and responsible for retrieving CTI event from session border controller.

As used herein, the term "Interaction Manager (IM)" refers to a microservice which is responsible for all events which are related to Computer telephony integration (CTI)/Call Details Records (CDR) which are received from the call center through SSM. The main purpose of this service is to manage the state of every CTI call i.e., event and send state to task manager microservice and a recording request to the relevant recorder. Once the call is finished, the IM sends the segment to the KDS. CTI and CDR may be used as JSON or .XML. CTI event or CDR event are used in Agent desktop applications to interact with telephones.

As used herein, the term "Sticky Session Manager (SSM)" refers to a generic router responsible for routing an event to the same target. It is important to make sure that an event received from InContact is forwarded to the same Interaction Management (IM) instance.

As used herein, the terms "Agent Desktop" or "agent dashboard" refer to an application which allows agents to view, manage, and schedule jobs. It is a desktop application for agents to manage the inbound/outbound contact center customer journey. Through this configurable desktop application, the agents access call context including Customer Relationship Management (CRM) records, billing systems, and Interactive Voice Response (IVR) entered data. It also acts as a single managed communications control with call controls, chat messaging, and agent state all in a unified client. The Agent Desktop is designed to empower agents and reduce call time by providing control and actionable intelligence in front of each agent. Agent Desktop is the gateway for handling calls, both inbound and outbound and other interactions, such as chat or emails.

As used herein, the term "Agent Desktop view" refers to a main view of all relevant information in front of the agents, so they can focus on the needs of the customer rather than trying to navigate through multiple screens applications and screens. It provides access to the most common features that are being used every day in a contact center, such as handling calls, changing status, calling internally, retrieving voicemail and managing channels, campaigns, KPIs, and messages. Also, a customer's context whether spoken, entered through touch-tones, is captured through text messaging or even captured by chatbot.

As used herein, the term "Web User Interface (UI)" refers to a web-based Agent desktop which is hosted on an on-demand cloud computing platforms such as AWS Cloud.

As used herein, the term "Representational state transfer (REST)" refers to a software architectural style that defines a set of constraints to be used for creating Web services.

As used herein, the term "Application Programming Interface (API)" refers to a computing interface which defines interactions between multiple software intermediaries.

As in almost every industry, keeping existing customers on board is a lot cheaper than acquiring new ones, which translates to a higher revenue for the organization. To keep existing customers, the organization has to constantly maintain their satisfaction because customer satisfaction is crucial to reducing customer churn and to having clients spend more money on the company's products.

Moreover, a loyal customer base means more referrals and more customers through the doors. However, if a customer is not satisfied, there's more than a slim chance that the customer will leave and go to the competitors. The customer may not only leave but also leave bad reviews that may damage the reputation of a business. According to the White House Office of Consumer Affairs, on average, loyal customers are worth up to 10 times as much as their first purchase. Some market researches state that it is 6-7 times more expensive to acquire a new customer than it is to keep a current one.

Over the past years, Customer Relationship Management (CRM) application experts noticed a decline in overall customer satisfaction rates. One explanation could be that contact centers are falling short on the quality of their service. For example, a long waiting time to get feedback or comment from a brand. It is known that gaining clients' trust takes up to 12 positive experiences to make up for one unresolved negative experience.

Customer satisfaction may also be reflected in the business revenue. Customers' opinion and feelings about a company's brand may affect, in both a positive and a negative way, the essential metrics. For example, the amount of repeated transactions, and also customer lifetime value or customer churn.

Another metric is an Average handle Time (AHT). AHT is a metric that is used in contact centers to measure efficiency in live interactions such as phone calls or live chats. AHT measures the average time that customers and the associate agents spend on a live interaction, including hold time and conversation time.

Accordingly, reduced AHT may be tied directly with a high level of client satisfaction of client service, because the clients may be provided with a prompt service. Also, focusing on ways to decrease the AHT in a contact center may help keeping the team of agents lean and powerful because it contributes to elevate agents' satisfaction which may maintain them as employees of the contact center for long term. Long-term agents provide a higher level of service due to their achieved set of skills in comparison to new agents thus, maintain the service not only prompt but also in a high quality. In other words, the longer it takes to handle a ticket, the longer customers have to wait and the more agents the contact center has to have in a shift to handle the same number of tickets which may result in dissatisfied clients and frustrated agents.

Accordingly, keeping the team of agents lean and powerful may reduce the contact center's expenses. For example, if there are 20 agents handling 6 calls per hour over 7 working hours, it results in a daily throughput of 840 calls. If the base number is lifted by just one call, from six to seven calls per hour then the daily call rate climbs to 980 calls per day, which sums up to a weekly increase of 700 calls. It is the equivalent the cost of extra 10 hours work that is saved.

Using the same example may also demonstrate service improvement, which results with an extra of 140 customers that are dealt with, every hour. Even if the customer doesn't complain during the interaction with the agent, the agent may apologize for the long waiting time and that takes time which, in turn, increases AHT. Another key way to improve service and reduce AHT is to provide agents with all the information they might need at their fingertips which means that the customer is also far more likely to get First Call Resolution (FCR).

Therefore, there is a need for a system and method that will improve client service by making sure that the agents in the contact center, take into account customer's time constraint i.e., time-limit, while answering a customer query. That is, there is a need for a system and a method for improving client service by empowering agents with greater clarity of customer time constraint i.e., time limit for the call, thus elevating client's satisfaction as call will be handled by the agent accordingly.

FIG. 1 schematically illustrates a high-level diagram of a computerized-method for improving client service by considering a time-limit, in accordance with some embodiments of the present invention.

According to some embodiments of the present disclosure, when a customer calls the contact center, the time-limit the customer has may be captured by the contact center. It can be either through IVR prompts or Automated Speech Recognition (ASR) tools.

Figure 3:
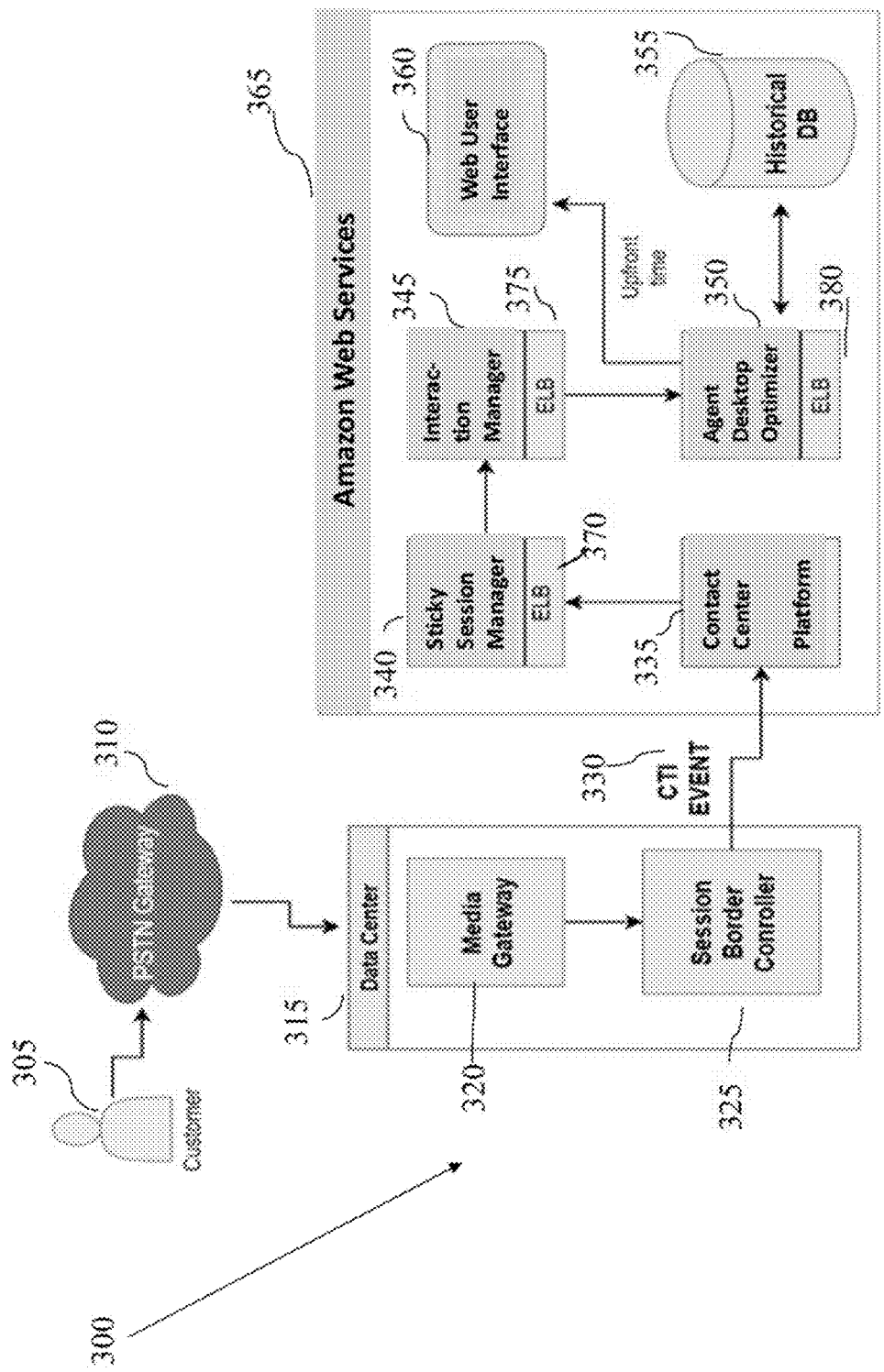
FIG. 3 schematically illustrates a high-level diagram of a computerized-system using a cloud-based computing environment for improving client service, in a contact center, in accordance with some embodiments of the present invention.

According to some embodiments of the present disclosure, in a computerized system such as contact center system 100, that is comprising a processor (not shown), a database of historical data 120; and a memory (not shown) to store the database, upon an inbound call i.e., customer call 105 to the contact center system 100, the processor may be configured to operate an Interaction Manager (IM) microservice to receive a Computer Telephony Integration (CTI) event and send it to a task manager such as an Agent Desktop Optimizer (ADO) module 350 in FIG. 3.

According to some embodiments of the present disclosure, the contact center system 100 may further include, a communication module and a user interface, an input device and an output device all not shown. The processor may include one or more processing units, i.e., of one or more computers. The processor may be configured to operate in accordance with programmed instructions which are stored in the memory. Furthermore, the processor may be capable of executing the ADO module such as ADO module 350 in FIG. 3.

Figure 5A:
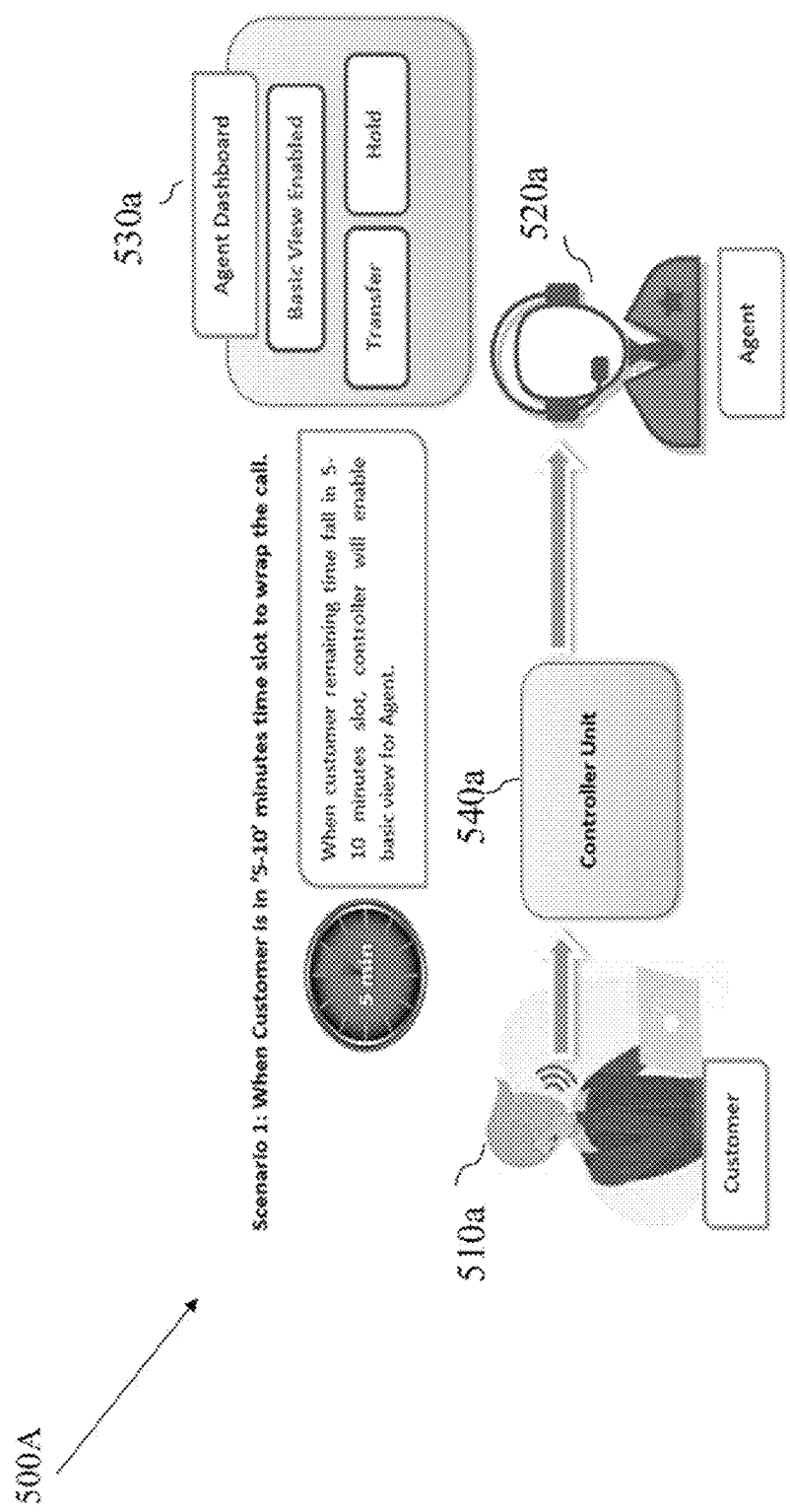
FIGS. 5A-5C are diagrams which illustrate an optimization of Agent desktop options as per the provided time-limit, in accordance with some embodiments of the present invention.
Figure 5B:
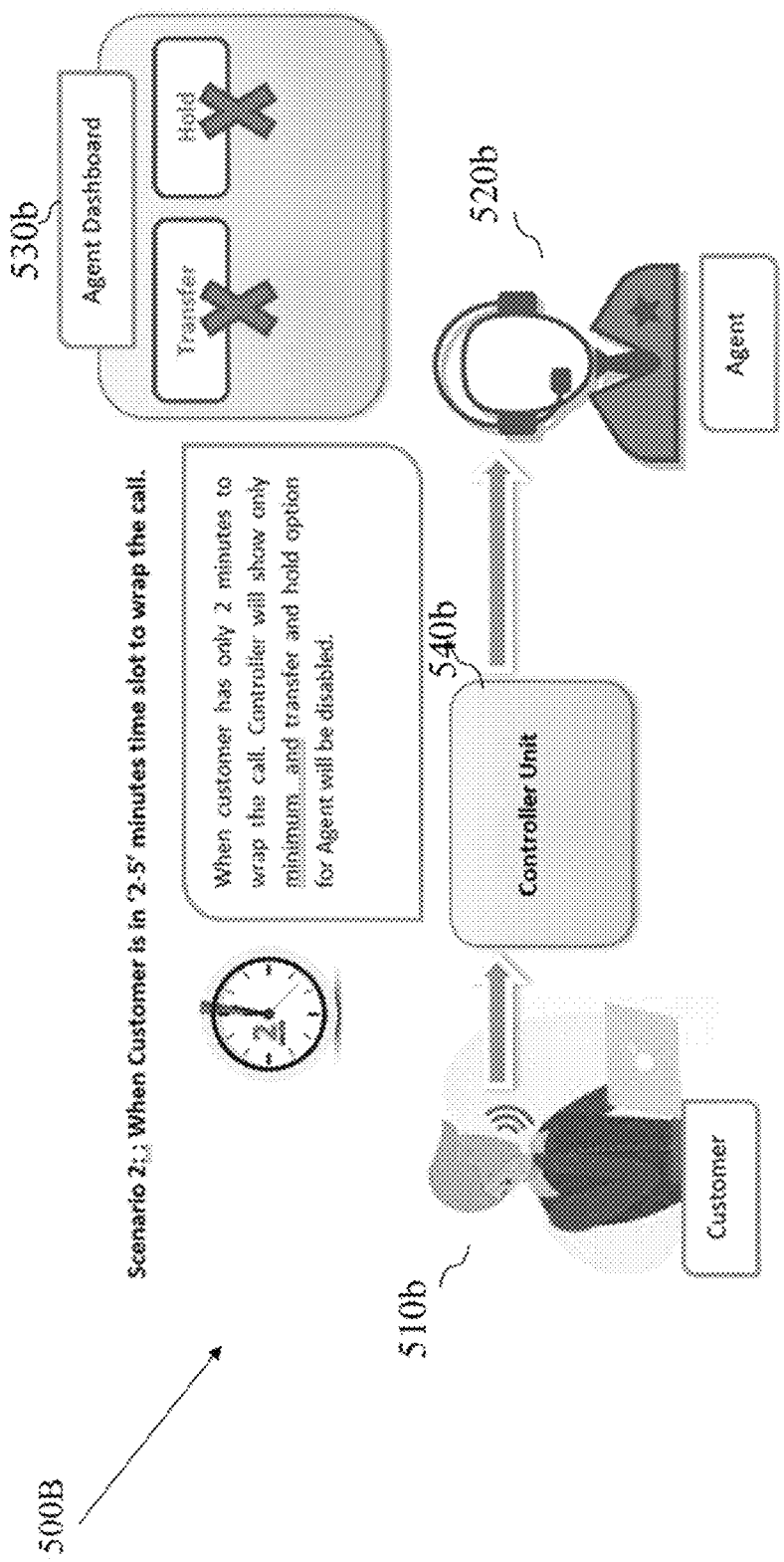
Figure 5C:
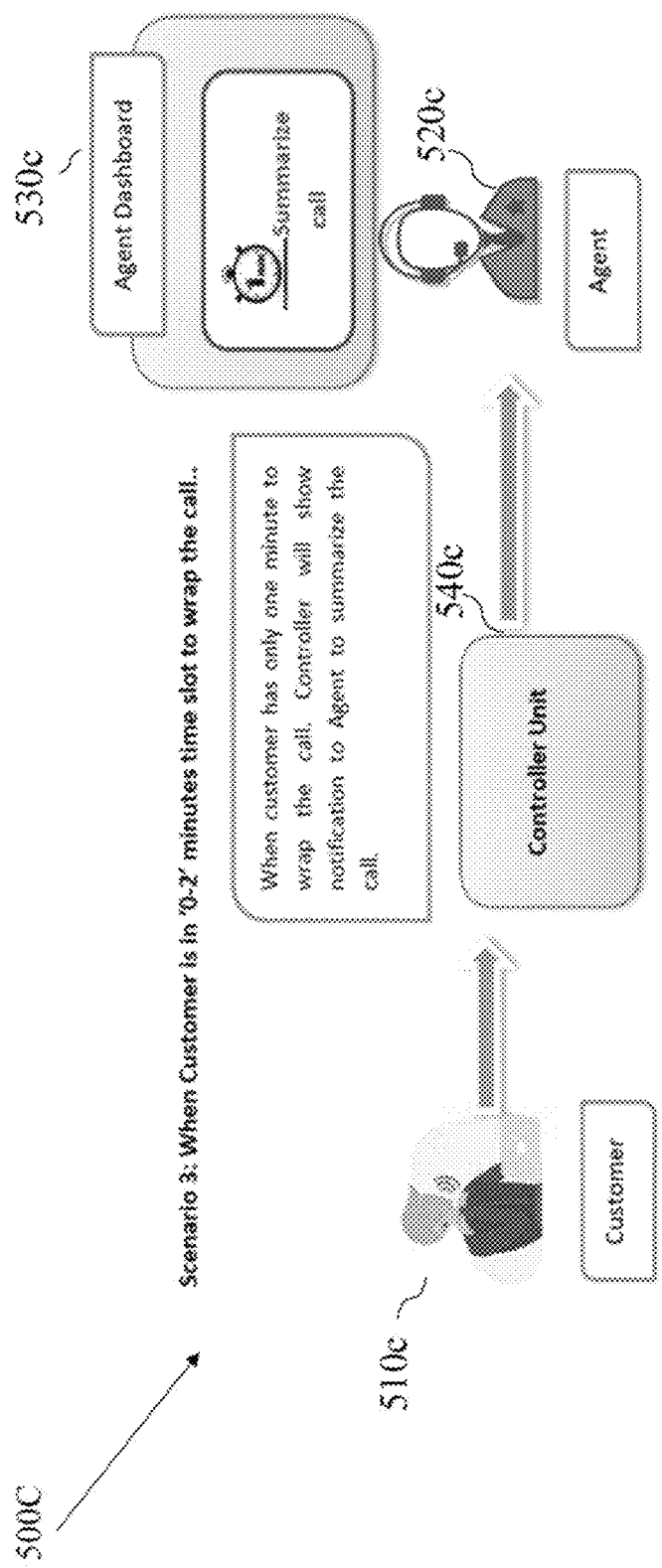

According to some embodiments of the present disclosure, the processor may communicate with the output device. For example, the output device may include a computer monitor or screen or display unit. The processor may communicate with a screen of the output device to display, for example, various agent dashboard views as shown in FIGS. 5A-5C. In another example, the output device may include a printer, display panel, speaker, or another device capable of producing visible, audible, or tactile output.

According to some embodiments of the present disclosure, the processor may communicate with the input device. For example, the input device may include one or more of: a keyboard, keypad, or pointing device for enabling a user to inputting data or instructions for operation of the processor. The processor may further communicate with the memory. The memory may include one or more volatile or nonvolatile memory devices. The memory may be utilized to store, for example, programmed instructions for operation of the processor, data or parameters for use by the processor during operation, or results of operation of the processor. The memory may include historical data database such as historical database 120, stored thereon. The data stored in the database 120 may include, in part, all type of interactions that happened in a past such as Voice, Chat, Email, Voice Screen, email screen, chat screen etc. of interactions between the customer and agent, customer details, customer interactions and related context and length and the like.

According to some embodiments of the present disclosure, the memory may include a computer readable medium for storing program instructions for operation of the processor. In this example, the programmed instructions may take the form of the ADO module which is running on the processor and optimizing the agent's dashboard by updating parameters in the agent dashboard during the inbound call.

According to some embodiments of the present disclosure, the ADO module may operate on the computerized system or may operate on a different computer at a different location communicating with the computerized system over a communication network.

According to some embodiments of the present disclosure, when the customer is calling from contact center applications on mobile, then the time-limit may be entered to the application itself and may be passed to the contact center system 100 through CUSTOM headers in Session Initiation Protocol (SIP) INVITE messages.

According to some embodiments of the present disclosure, the ADO module may be configured to retrieving a context of a query and a time-limit of a client from the such as CTI event 110 or CTI event 330 in FIG. 3.

According to some embodiments of the present disclosure, the ADO module may be configured to attempting to retrieve data from the database of historical data 120 to evaluate average resolution time for the received context 115.

According to some embodiments of the present disclosure, the average historical time of the customer or of other customers, for a given call context, e.g., query relative to Human Resources (HR), finance and accounting or technical support, may be taken into consideration. When the time-limit that the client has provided for the interaction is greater than the average historical time i.e., evaluated average resolution time, of the customer for a given call context, then the average resolution time of the customer for a given call context may take precedence over the time-limit that the client has provided, in order to optimize Agent dashboard option. But when the time-limit that the customer has provided is lower than the average resolution time for a given call context, then the time-limit may be taken into consideration. The average resolution time may be calculated for a specific client or for other customers during a preconfigured period of time.

According to some embodiments of the present disclosure, checking if the data is found 125 in the historical database 120 and when the data is found, comparing the evaluated average resolution time with the received time-limit and when the received time-limit is below the evaluated average resolution time, sending the client a delay notice and providing the client a menu of options for querying through other channels 130. The delay notice may include the average resolution time that is required for the context of the query, thus notifying the customer that with the time-limit that the customer has provided a proper response is not likely to be achieved.

According to some embodiments of the present disclosure, the data may be related to the specific customer and accordingly, the evaluated average resolution time may be specific to the client for the received context or may be related to all customers for the received context during a preconfigured period of time.

According to some embodiments of the present disclosure, once the call between an agent and a customer gets connected, the agent desktop i.e., agent dashboard may be presented with options in line with the time-limit that the customer has for the call. The dashboards on Agent's screen may also be optimized as per the time-limit of the customer as shown in detail in FIGS. 5A-5C.

According to some embodiments of the present disclosure, the time-limit of the client may be taken into account during various stages of the call. For example, when the call is waiting in a queue of the call context, when the call is about to connect to the agent, etc. and accordingly adjust agent desktop views while resolving the query as will be shown in more detail in FIGS. 5A-5C.

According to some embodiments of the present disclosure, when the data is not found in the historical database 120, or when the received time-limit is above the evaluated average resolution time 135, presenting on an agent dashboard, via a display unit, the time-limit of the client and accordingly updating parameters in the agent dashboard during the inbound call 140. Thus, improving client service, by considering the time-limit of the client before the agent addresses the query of the client.

According to some embodiments of the present disclosure, the average resolution time is evaluated by retrieving the total amount of time for a total number of interactions related to the received context during a preconfigured period of time and dividing the retrieved total amount of time by the total number of interactions.

According to some embodiments of the present disclosure, the option to enter a time-limit may be available by configuring the ADO module such as ADO module 350 in FIG. 3 only for premium customers to elevate the level of service specifically for them.

Figure 2:
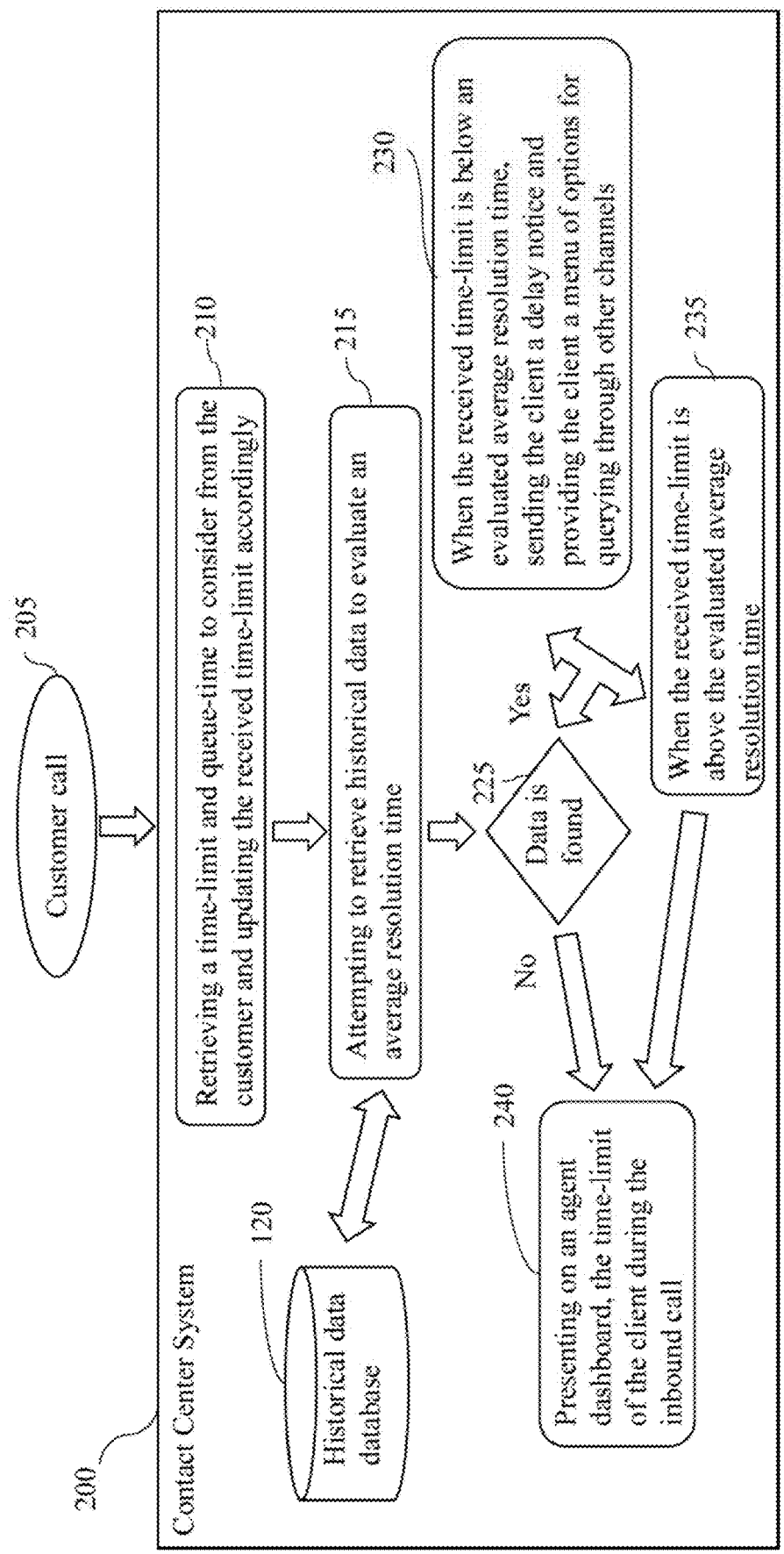
FIG. 2 schematically illustrates a high-level diagram of a computerized-method for improving client service by considering a time-limit and queue-time, in accordance with some embodiments of the present invention.

FIG. 2 schematically illustrates a high-level diagram of a computerized-method for improving client service by considering a time-limit and queue-time, in accordance with some embodiments of the present invention.

According to some embodiments of the present disclosure, in a computerized system such as contact center system 200, that is comprising a processor (not shown), a database of historical data 220; and a memory (not shown) to store the database, upon an inbound call i.e., customer call 205 to the contact center, the processor may be configured to operate an Interaction Manager (IM) microservice to receive a Computer Telephony Integration (Ci) event such as CTI event 330 in FIG. 3 and send it to an Agent Desktop Optimizer (ADO) module such as ADO module in FIG. 3.

According to some embodiments of the present disclosure, the ADO module may be configured to retrieving a time-limit and queue-time to consider from the customer and updating the received time-limit accordingly 210.

According to some embodiments of the present disclosure, the queue-time for the call may be taken into consideration. Once the call gets connected to the agent, the queue-time for the call may be taken into consideration while providing time-limit to the agent desktop. For example, if the customer provided a time-limit of 10 minutes and the queue-time for the call has been evaluated to be 3 minutes, then the actual time which will be taken into consideration while call gets connected to agent, will be the time-limit that the client has provided reduced by the queue-time, e.g., 10 minutes minus 3 minutes which equals 7 minutes. Thus, resolving the customer query by taking into account the time limit of the customer and providing an optimized Agent Desktop view to the agent.

According to some embodiments of the present disclosure, after evaluating the context for which the customer has called, the queue-time, e.g., the average waiting time for that skill or context may be evaluated. And it will be compared with the customer time limit which the client has mentioned. If the time-limit is lower than the average waiting time, then the customer can be informed and given an option for reaching through other methods like arranging a callback, leaving voice message on Interactive voice response (IVR) regarding the issue for which the client has called.

According to some embodiments of the present disclosure, the ADO module may be configured to attempt to retrieve data from the database of historical data 220 to evaluate average resolution time for the received context 215.

According to some embodiments of the present disclosure, checking if the data is found 225 in the historical database 220 and when the data is found, comparing the evaluated average resolution time with the received time-limit and when the received time-limit is below the evaluated average resolution time, sending the client a delay notice and providing the client a menu of options for querying through other channels 230. The delay notice may include the average resolution time that is required for the context of the query, thus notifying the customer that with the time-limit that the customer has provided a proper response is not likely to be achieved.

According to some embodiments of the present disclosure, the data may be related to the specific customer and accordingly, the evaluated average resolution time may be specific to the client for the received context or may be related to all customers for the received context during a preconfigured period of time.

According to some embodiments of the present disclosure, when the data is not found in the historical database 220, or when the received time-limit is above the evaluated average resolution time 235, presenting on an agent dashboard, via a display unit, the time-limit of the client and accordingly updating parameters in the agent dashboard during the inbound call 240. Thus, improving client service, by considering the time-limit of the client before the agent addresses the query of the client.

According to some embodiments of the present disclosure, the average resolution time is evaluated by retrieving the total amount of time for a total number of interactions related to the received context during a preconfigured period of time and dividing the retrieved total amount of time by the total number of interactions.

According to some embodiments of the present disclosure, by considering the client's time-limit the contact center may provide a better customer experience, because the contact center may reduce abrupt customer driven call disconnections. It may also lead to reduction of expenses due to efficient performance of the agents in the contact centers.

FIG. 3 schematically illustrates a high-level diagram of a computerized-system 300 using a cloud-based computing environment for improving client service, in a contact center, in accordance with some embodiments of the present invention.

According to some embodiments of the present disclosure, a microservice architecture supporting a high availability and Auto Scaling. In an on-demand cloud computing platforms such as AWS cloud, each microservices may be installed inside a docker container named as Amazon Elastic Compute Cloud (EC2) Instance, which is a virtual server in Amazon's EC2 for running applications on an AWS infrastructure.

According to some embodiments of the present disclosure, each microservice is having at least two instances or may be configured to many instances to provide high availability solution with different configurations of Central Processing Unit (CPU), Memory, storage and networking resources to suit user needs.

According to some embodiments of the present disclosure, for every MS instance such as Sticky Session Manager (SSM) 340, Interaction Manager (IM) 345 and ADO module 350, an Elastic Load Balancer (ELB) is attached to it 370, 375 and 380 respectively. ELB is a load-balancing service for Amazon Web Services (AWS) deployments. ELB service automatically distributes an incoming application traffic and scales resources to meet traffic demands.

According to some embodiments of the present disclosure, the purpose of automatic scaling is to automatically increase the size of the Auto Scaling group when demand goes up and decrease it when demand goes down. As capacity is increased or decreased, the Amazon EC2 instances being added or removed must be registered or deregistered with the ELB service. This enables an application to automatically distribute incoming web traffic across a dynamically changing number of instances.

According to some embodiments of the present disclosure, a customer 305 may dial the contact center number and a call will be connected to the relevant contact center such as data center 315 through PSTN gateway 310.

According to some embodiments of the present disclosure, when IVR options are being played to the customer 305 the customer 305 may provide a time-limit for the query.

According to some embodiments of the present disclosure, a media gateway 320 in the data center 315 may convert an incoming signal into a relevant SIP format and provide this information to a Session Border Controller (SBC) 325.

According to some embodiments of the present disclosure, a contact center platform or microservice 335 may be hosted on an on-demand cloud computing platforms such as a platform that Amazon provides, e.g., AWS cloud 365.

According to some embodiments of the present disclosure, the contact center platform or microservice 335 may receive a Computer Telephony Integration (CTI) event 330 from the SBC 325 and may send it to a Sticky Session Manager (SSM) 340.

According to some embodiments of the present disclosure, the SSM 340 may forward the CTI event 330 to an Interaction Manager (IM) Module 345 and the IM module 345 may send the CTI event 330 to a task manager such as an Agent Desktop Optimizer (ADO) module 350 through Representational State Transfer (REST) Application Programming Interface (API).

According to some embodiments of the present disclosure, the ADO module 350 may retrieve a context of a query and a time-limit of a client from the CTI event.

According to some embodiments of the present disclosure, the ADO module 350 may attempt to retrieve data from a database of historical data 355 to evaluate average resolution time for the received context.

According to some embodiments of the present disclosure, when the data is found, the ADO module 350 may compare the evaluated average resolution time with the received time-limit and when the received time-limit is below the evaluated average resolution time, ADO module 350 may send the client a delay notice and may provide the client a menu of options for querying through other channels.

According to some embodiments of the present disclosure, when the data is not found, or when the received time-limit is above the evaluated average resolution time, ADO module 350 may present on an agent dashboard, via a display unit, the time-limit of the client and accordingly update parameters in the agent dashboard during the inbound call, thus, improving client service, by considering the time-limit of the client before the agent addresses the query of the client.

According to some embodiments of the present disclosure, the time-limit is provided to a WEB UI element 360 such as Agent desktop and accordingly agent desktop options may be optimized as will be explained in detail in FIGS. 5A-5C.

Figure 4:
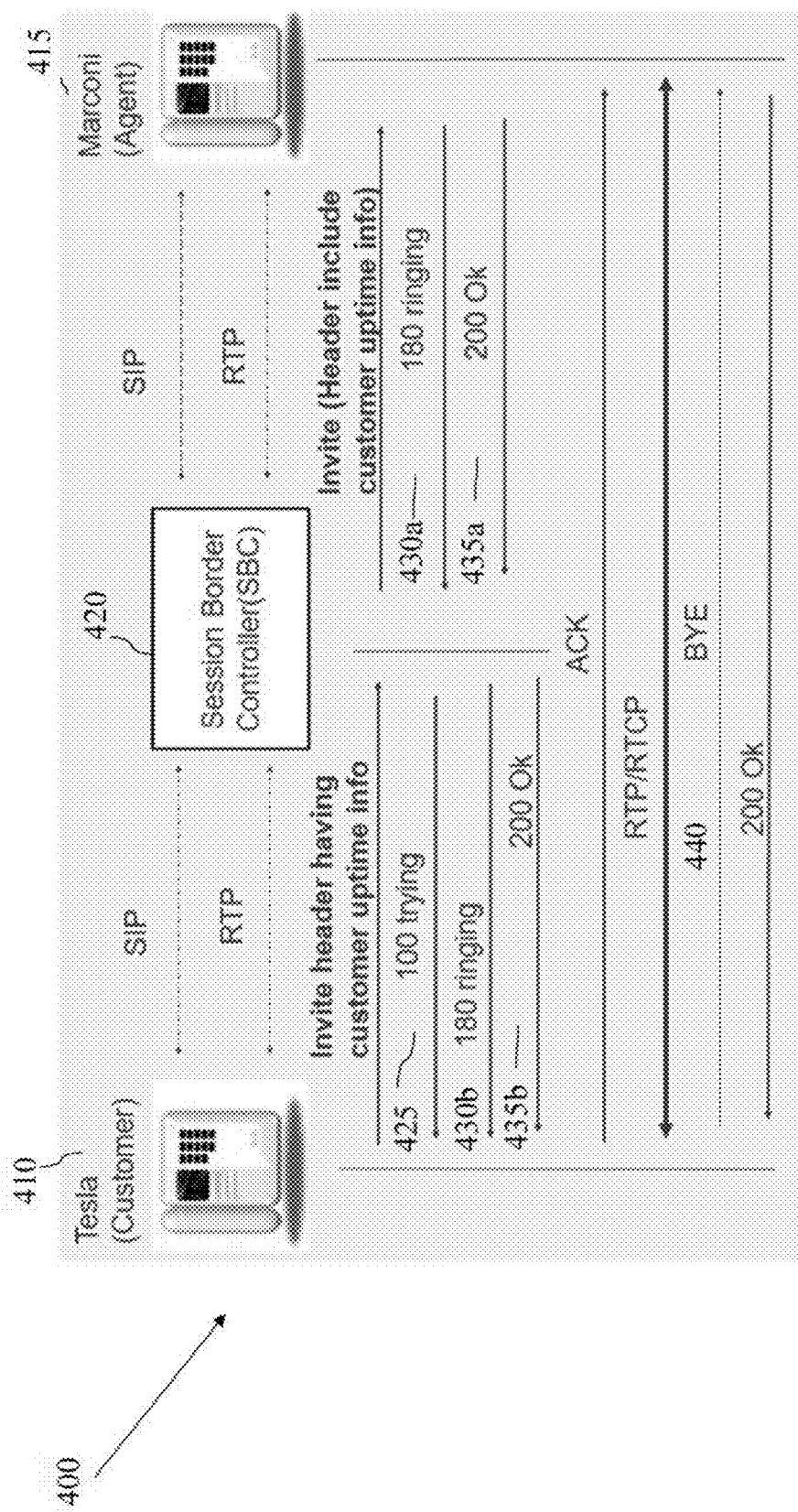
FIG. 4 schematically illustrates a high-level diagram of inclusion of a max time information in a SIP Invite header message, in a contact center, in accordance with some embodiments of the present invention.

FIG. 4 schematically illustrates a high-level diagram of inclusion of a max time information i.e., time-limit in a SIP Invite header message, in a contact center, in accordance with some embodiments of the present invention.

According to some embodiments of the present disclosure, when a customer calls a contact center, the time constraint of the customer i.e., time-limit may be captured by the contact center. The time-limit may be captured either through IVR prompts or Automated Speech Recognition (ASR) tools.

According to some embodiments of the present disclosure, the time-limit may be captured only for premium customers to provide a better service for them.

According to some embodiments of the present disclosure, when the customer is calling from a contact center application that is running on mobile, then the option to insert time-limit may be provided in the application itself and may be forwarded through CUSTOM headers in Session Initiation Protocol (SIP) INVITE messages.

According to some embodiments of the present disclosure, customer device Tesla 410 may send an INVITE SIP message which includes max time that has been provided by the customer to the Session Border Controller 420 such as SBC 325 in FIG. 3.

According to some embodiments of the present disclosure, SBC 420 may send 100 trying response 425 back to customer device Tesla 410.

According to some embodiments of the present disclosure, SBC 420 may forward an INVITE sip message with Session Description Protocol (SDP) and metadata to Agent device Marconi 415.

According to some embodiments of the present disclosure, agent device Marconi 415 may respond with 180 ringing response 430a to the SBC 420.

According to some embodiments of the present disclosure, SBC 420 may send a 180 ringing response 430b to the customer device Tesla 410.

According to some embodiments of the present disclosure, agent device Marconi 415 may forward a 200 ok response 435a to the SBC 420 and 200 ok response 435b is being forwarded to the customer device Tesla 410.

According to some embodiments of the present disclosure, a Real-Time Transport Protocol (RTP) stream may be initiated between the agent device Marconi 415 and the SBC 420.

According to some embodiments of the present disclosure, the RTP stream may be initiated between SBC 420 and customer device Tesla 410 and a call has been established between customer device Tesla 410 and agent device Marconi 415.

According to some embodiments of the present disclosure, customer device Tesla 410 may send a BYE message 440 to SBC 420 and then SBC 420 responds with OK to agent device Marconi 415. Then, SBC 420 sends BYE to customer device Tesla 410 which responds with OK to SBC 420.

FIGS. 5A-5C are diagrams which illustrate an optimization of Agent desktop options as per the provided time-limit, in accordance with some embodiments of the present invention.

In a non-limiting example, FIG. 5A shows a scenario when the average call resolution time for an ongoing call context is 8 minutes and the customer time-limit is 10 minutes, accordingly a controller unit 540a such as an ADO module e.g., ADO 350 in FIG. 3, may enable the current agent desktop 530a to operate regular views e.g., basic view enabled, as it is currently operating. It means that the customer 510a may be transferred to another agent or to a supervisor during the interaction or the call may be placed on hold to provide the agent 520a some time to retrieve relevant knowledge.

In a non-limiting example, FIG. 5B shows a scenario when the time-limit of the customer 510b is in a 2-5 minutes time window, accordingly, a controller unit 540b such as an ADO module e.g., ADO 350 in FIG. 3 may optimize the agent desktop 530b to include recommendations to the agent such as not using transfer or hold call controls during the interaction in order to be able to finalize the call before the time-limit is over.

In a non-limiting example, FIG. 5C shows a scenario when the customer time-limit is close to end and the customer 510c has only a couple of minutes left e.g., less than 2 minutes available, accordingly, a controller unit 540b such as an ADO module e.g., ADO 350 in FIG. 3 may operate the agent desktop view 530c to include a recommendation to summarize the call so the agent 520c may summarize the next steps for ticket resolution and may accordingly arrange a call back to the customer 510c when the customer 510c is available, so that the call may end on a conclusive note with clearly defined next steps.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method in a contact center, the computerized-method comprising:
   upon receiving an inbound call to the contact center, sending a Computer Telephony Integration (CTI) event to an Agent Desktop Optimizer (ADO) module, said ADO module is configured to:
   retrieving a context of a query and a time-limit of a client from the CTI event;
   attempting to retrieve data from a database of historical data to evaluate average resolution time for the received context;
   when the data is found, comparing the evaluated average resolution time with the received time-limit and when the received time-limit is below the evaluated average resolution time, sending the client a delay notice and providing the client a menu of options for querying through other channels,
   when the data is not found, or when the received time-limit is above the evaluated average resolution time, presenting on an agent dashboard, via a display unit, the time-limit of the client and accordingly updating parameters in the agent dashboard during the inbound call.

2. The computerized-method of claim 1, wherein the delay notice includes the average resolution time required for the context of the query.

3. The computerized-method of claim 1, wherein the average resolution time is evaluated by retrieving the total amount of time for a total number of interactions related to the received context during a preconfigured period of time and dividing the retrieved total amount of time by the total number of interactions.

4. The computerized-method of claim 1, wherein upon a selection of the client to consider time-queue, the ADO module is further configured to update the received time-limit by reducing an evaluated average waiting time for the received query from said received time-limit before attempting data retrieval from the database of historical data.

5. The computerized-method of claim 4, wherein the ADO module is further configured to send the evaluated average waiting time to the client.

6. The computerized-method of claim 1, wherein the menu of options includes at least one of: a callback, leaving voice message on IVR an email, a chat, a Short Message Service (SMS) or any other communication channel.

7. The computerized-method of claim 1, wherein the evaluated average waiting time is calculated according to the number of interactions in a queue of related context multiplied by an evaluated average resolution time.

8. The computerized-method of claim 1, wherein the time-limit is received via a contact center application that is operating on a mobile device of the client, wherein the contact center application inserts the time-limit into a header of a Session Initiation Protocol (SIP) INVITE message and the ADO module is retrieving the time-limit from the SIP INVITE message.

9. The computerized-method of claim 1, wherein the agent dashboard is operated by a web User Interface (UI).

10. A computerized-system in a contact center, the computerized-system comprising:
a processor;
upon receiving an inbound call to the contact center, sending a Computer Telephony Integration (CTI) event to an Agent Desktop Optimizer (ADO) module, said ADO module is configured to:
retrieve a context of a query and a time-limit of a client from the CTI event;
attempt to retrieve data from a database of historical data to evaluate average resolution time for the received context;
when the data is found, compare the evaluated average resolution time with the received time-limit and when the received time-limit is below the evaluated average resolution time, send the client a delay notice and provide the client a menu of options for querying through other channels,
when the data is not found, or when the received time-limit is above the evaluated average resolution time, present on an agent dashboard, via a display unit, the time-limit of the client and accordingly update parameters in the agent dashboard during the inbound call.

11. The computerized-system of claim 10, wherein the delay notice includes the average resolution time required for the context of the query.

12. The computerized-system of claim 10, wherein the computerized-system is further configured to evaluate the average resolution time by retrieving the total amount of time for a total number of interactions related to the received context during a preconfigured period of time and dividing the retrieved total amount of time by the total number of interactions.

13. The computerized-system of claim 10, wherein upon a selection of the client to consider time-queue, the ADO module is further configured to update the received time-limit by reducing an evaluated average waiting time for the received query from said received time-limit before data retrieval data from the database of historical data.

14. The computerized-system of claim 10, wherein the ADO module is further configured to send the evaluated average waiting time to the client.

15. The computerized-system of claim 10, wherein the menu of options includes at least one of: a callback, leaving voice message on IR, an email, a chat, a Short Message Service (SMS) and any other communication channel.

16. The computerized-system of claim 10, wherein the evaluate average waiting time is calculated according to the number of interactions in a queue of related context multiplied by the evaluated average resolution time.

17. The computerized-system of claim 10, wherein the time-limit is received via a contact center application that is operating on a mobile device of the client, wherein the contact center application inserts the time-limit into a header of a Session Initiation Protocol (SIP) INVITE message and the ADO module is retrieving the time-limit from the SIP INVITE message.

18. The computerized-system of claim 10, wherein the agent dashboard is operated by a web User Interface (UI).

* * * * *